US011564530B2

(12) United States Patent
Zhang et al.

(10) Patent No.: US 11,564,530 B2
(45) Date of Patent: Jan. 31, 2023

(54) TWO-END-THROUGH VACUUM HEAT-INSULATED CONTAINER OUTER TUBE SEALING STRUCTURE AND SEALING METHOD

(71) Applicant: JIANG SU SUN-UPPER STAINLESS STEEL PRODUCTS CO., LTD., Jiangsu (CN)

(72) Inventors: Jiafei Zhang, Yangzhou (CN); Chen Li, Yangzhou (CN)

(73) Assignee: JIANG SU SUN-UPPER STAINLESS STEEL PRODUCTS CO., LTD., Yangzhou (CN)

( * ) Notice: Subject to any disclaimer, the term of this patent is extended or adjusted under 35 U.S.C. 154(b) by 120 days.

(21) Appl. No.: 17/277,442

(22) PCT Filed: Apr. 10, 2018

(86) PCT No.: PCT/CN2018/082434
§ 371 (c)(1),
(2) Date: Mar. 18, 2021

(87) PCT Pub. No.: WO2019/195999
PCT Pub. Date: Oct. 17, 2019

(65) Prior Publication Data

US 2021/0345827 A1 Nov. 11, 2021

(51) Int. Cl.
*A47J 41/02* (2006.01)
*B23K 26/282* (2014.01)

(52) U.S. Cl.
CPC .......... *A47J 41/028* (2013.01); *B23K 26/282* (2015.10)

(58) Field of Classification Search
CPC .......... A47J 41/028; A47J 41/00; A47J 41/02; A47J 41/022; A47J 41/024; A47J 41/026;
(Continued)

(56) References Cited

U.S. PATENT DOCUMENTS 3,961,720 A * 6/1976 Potter, Jr. ................ A47J 41/02 215/12.2
5,153,977 A * 10/1992 Toida .................... B23K 1/001 29/422
(Continued)

FOREIGN PATENT DOCUMENTS

CN 104771091 A 7/2015
CN 105266654 A 1/2016
(Continued)

OTHER PUBLICATIONS

Jan. 17, 2019 International Search Report issued in International Patent Application No. PCT/CN2018/082434.
(Continued)

*Primary Examiner* — John K Fristoe, Jr.
*Assistant Examiner* — Laura E. Parker
(74) *Attorney, Agent, or Firm* — Oliff PLC

(57) ABSTRACT

A two-end-through vacuum heat-insulated container outer tube sealing structure includes a vacuum heat-insulated container outer tube, where a shoulder part of the vacuum heat-insulated container outer tube is provided with a plane; a vacuum cavity is formed in the plane; a vacuum hole for vacuum pumping is formed in the vacuum cavity; the vacuum cavity is filled with a sealing material; a side surface of the plane of the shoulder part is provided with a circular step from top to bottom; a shielding cover is subjected to primary welding on the circular step; a weld bead of the welding is removed by polishing; the shielding cover and the circular step are in gap-free fit; the other end of the shielding cover is subjected to secondary welding with a mouth part of a bottle body; and the weld bead of the welding is removed by sanding the mouth.

8 Claims, 1 Drawing Sheet

10
11
12
1
2
3
4
6
7
8
5
9

(58) Field of Classification Search
CPC .............. A47J 41/0055; A47J 41/0061; B23K 26/282; B23K 9/167; B23K 26/24; A47G 2023/0275; A47G 2023/0283; B65D 81/3876; B65D 81/3881
USPC ..................................................... 220/592.27
See application file for complete search history.

(56) References Cited

U.S. PATENT DOCUMENTS

2015/0158657 A1* 6/2015 Olson ................... A47J 41/028
220/592.27
2015/0197390 A1* 7/2015 Kurabe .............. B65D 81/3841
220/592.27
2018/0353011 A1* 12/2018 Pinelli ...................... C25D 7/04

FOREIGN PATENT DOCUMENTS

| | | | | |
|---|---|---|---|---|
| CN | 106136769 | A | * | 11/2016 |
| CN | 206491708 | U | | 9/2017 |
| CN | 108354471 | A | | 8/2018 |
| CN | 110315284 | A | * | 10/2019 |
| JP | 2000-005073 | A | | 1/2000 |
| JP | 2000-316729 | A | | 11/2000 |

OTHER PUBLICATIONS

Oct. 13, 2020 International Preliminary Report on Patentability issued in International Patent Application No. PCT/CN2018/082434.

* cited by examiner

TWO-END-THROUGH VACUUM HEAT-INSULATED CONTAINER OUTER TUBE SEALING STRUCTURE AND SEALING METHOD

BACKGROUND

Technical Field

The present invention relates to the technical field of metal vacuum cup containers, and in particular, to a two-end-through vacuum heat-insulated container outer tube sealing structure and sealing method.

Related Art

Two-end-through vacuum cups currently on the market are mainly in the following four types: the first type is to adopt a double-layer structure without vacuum pumping, and this type of structure cannot provide heat preservation, wastes energy, and may cause scalds; the second type is to form a vacuum cavity inside a bottle body, and this type of structure may provide heat preservation, but the sealing material for a vacuum cup is glass, which generally contains lead that is a heavy metal harmful to a human body; the third type is to form a vacuum hole on an outer tube, and then cover same with a sticker or the like, and for this type of structure, during daily usages, the sticker may fall off with the usage time, frequency and cleaning so that the glass sealing material is exposed to be in contact with the human body and cause appearance defects; and the fourth type is to form the vacuum hole on the outer tube, and then cover same through stainless steel butt-joint welding, and this type of structure cannot fully seal the glass sealing material, water would also flow into the cup during washing, and the appearance would also be affected.

SUMMARY

An objective of the present invention is to provide a two-end-through vacuum heat-insulated container outer tube sealing structure and sealing method, which solves the problems that the existing sealing structure is easy to fall off, unsightly, easy to break, and unsanitary.

The technical solution of the present invention is: a two-end-through vacuum heat-insulated container outer tube sealing structure, including a vacuum heat-insulated container outer tube, where a shoulder part of the vacuum heat-insulated container outer tube is provided with a plane; a vacuum cavity is formed in the plane; a vacuum hole for vacuum pumping is formed in the vacuum cavity; and the vacuum cavity is filled with a sealing material; where a side surface of the plane of the shoulder part is provided with a circular step from top to bottom; a shielding cover is subjected to primary welding on the circular step; a weld bead of the welding is removed by polishing; the shielding cover and the circular step are in gap-free fit; the other end of the shielding cover is subjected to secondary welding with a mouth part of a bottle body; and the weld bead of the welding is removed by sanding the mouth.

The shielding cover and the circular step are in gap-free fit.

The shielding cover and the heat-insulated container outer tube are made of stainless steel.

The welding for the shielding cover and the circular step is laser welding.

The weld beads of the shielding cover and the circular step are removed by polishing.

The welding for the other end of the shielding cover and the mouth part of the bottle body is laser welding or argon arc welding.

The weld beads of the other end of the shielding cover and the mouth part of the bottle body are removed by sanding the mouth.

A two-end-through vacuum heat-insulated container outer tube sealing method, including the sealing structure according to and of the above-recited embodiments and including the following steps:

step I, placing a shielding cover on a step at a side surface of a shoulder part of a vacuum heat-insulated container, and laser welding and fixing;

step II, laser welding or mouth welding the other end of the shielding cover to a mouth part of the vacuum heat-insulated container;

step III, removing a weld bead generated by laser welding in step I by polishing; and step IV, removing a weld bead generated by laser welding or argon arc welding in step II by sanding the mouth.

According to the present invention, glass consumables do not affect appearance while ensuring vacuum heat preservation, and under the condition that the container is not damaged, the glass consumables are not shown, and are not in contact with a medium in the heat-insulated container; moreover, harm of lead contained in the glass consumables to a human body is prevented. After primary welding, a weld bead caused by welding may be left, and after being polished, the weld bead is necessarily removed and cannot be viewed on the outer tube, the weld lead and an outer housing are integrated, and the appearance is attractive.

Figure 2:
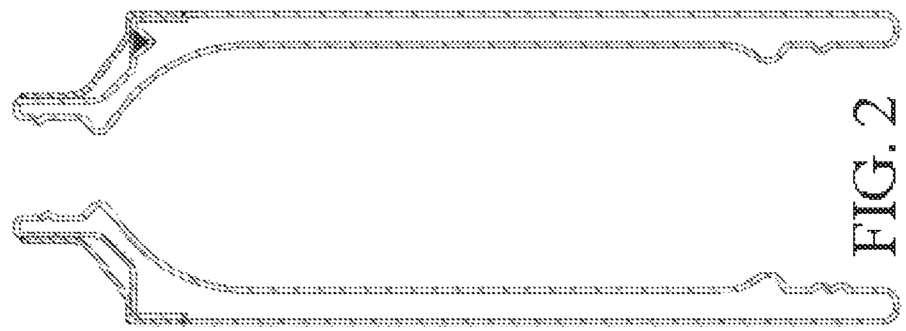
FIG. 2 is a schematic structural diagram of a vacuum heat-insulated container.
Figure 1:
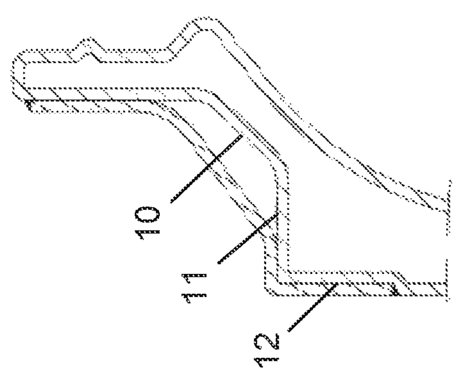
FIG. 1 is a schematic structural diagram of the present invention.

In the drawings, 1: container mouth part; 2: secondary welding; 3: shielding cover; 4: outer tube; 5: vacuum hole; 6: vacuum cavity; 7: glass consumables; 8: circular step; and 9: primary welding; 10: shoulder part; 11: plane; 12 side surface.

DETAILED DESCRIPTION

A two-end-through vacuum heat-insulated container outer tube sealing structure includes a vacuum heat-insulated container outer tube 4, where a shoulder part 10 of the vacuum heat-insulated container outer tube 4 is provided with a plane 11; a vacuum cavity 6 is formed in the plane 11; a vacuum hole 5 for vacuum pumping is formed in the vacuum cavity 6; the vacuum cavity 6 is filled with a glass sealing material 7; during vacuum processing, the glass sealing material 7 is heated so that the glass sealing material 7 is melted and seals the vacuum hole 5; where a side surface 12 of the plane 11 of the shoulder part 10 is provided with a circular step 8 from top to bottom; a shielding cover 3 is subjected to primary welding 9 on the circular step 8; the shielding cover 3 is fitted at the circular step 8 of the outer tube 4; the shielding cover 3 is fixed on the circular step 8 of the outer tube 4 through primary laser welding; a weld bead of the primary welding 9 is removed by polishing; the shielding cover 3 and the circular step 8 are in gap-free fit; the other end of the shielding cover 3 is subjected to secondary welding with a mouth part of a bottle body; and the weld bead of the welding is removed by sanding the mouth, so that the glass sealing material 7 for sealing cannot be found in the appearance of the vacuum heat-insulated container.

The shielding cover 3 and the circular step 8 are in gap-free fit.

The shielding cover 3 and the heat-insulated container outer tube 4 are made of stainless steel.

The welding for the shielding cover 3 and the circular step 8 is laser welding.

The weld beads of the shielding cover 3 and the circular step 8 are removed by polishing.

The welding for the other end of the shielding cover 3 and the container mouth part 1 is laser welding or argon arc welding.

The weld beads of the other end of the shielding cover 3 and the container mouth part 1 are removed by sanding the mouth.

A two-end-through vacuum heat-insulated container outer tube sealing method includes the sealing structure according to any one of above-recited embodiments and includes the following steps:

step I, placing a shielding cover 3 on a circular step 8 at a side surface 12 of a shoulder part 10 of a vacuum heat-insulated container, and laser welding and fixing;

step II, laser welding or mouth welding the other end of the shielding cover 3 to a mouth part 1 of the vacuum heat-insulated container;

step III, removing a weld bead generated by laser welding in step I by polishing; and step IV, removing a weld bead generated by laser welding or argon arc welding in step II by sanding the mouth.

The embodiments above are merely used for explaining the creation of the present invention rather than limiting the technical solutions described in the creation of the present invention, and therefore, although the description already explains the creation of the present invention in detail with reference to the embodiments above, a person having ordinary skill in the art should understand that the creation of the present invention can still be modified and equivalently replaced; moreover, the technical solutions and improvements thereof that do not depart from the spirits and scopes of the creation of the present invention should all fall within the claims of the creation of the present invention.

What is claimed is:

1. A two-end-through vacuum heat-insulated container outer tube sealing structure, comprising:

an outer tube of a vacuum heat-insulated container;

a shoulder part of the outer tube extending to a plane;

a vacuum cavity formed in the plane, a vacuum hole for vacuum pumping being formed in the vacuum cavity, and the vacuum cavity being filled with a sealing material;

a side surface extending from the plane of the shoulder part to a circular step from top to bottom; and a shielding cover, a first end of the shielding cover including tea primary weld eat the circular step, a first weld bead formed by the primary weld being removed by polishing, the shielding cover and the circular step being in gap-free fit and a second end of the shielding cover including a secondary weld with a mouth part of a bottle body, a second weld bead of the secondary weld being removed by sanding the mouth part.

2. The two-end-through vacuum heat-insulated container outer tube sealing structure according to claim 1, wherein the shielding cover and the outer tube of the heat-insulated container are made of stainless steel.

3. The two-end-through vacuum heat-insulated container outer tube sealing structure according to claim 1, wherein the primary weld for the first end of the shielding cover and the circular step is laser welded.

4. The two-end-through vacuum heat-insulated container outer tube sealing structure according to claim 1, wherein the secondary weld for the second end of the shielding cover and the mouth part of the container is laser welded or argon arc welded.

5. A method for sealing the two-end-through vacuum heat-insulated container outer tube sealing structure as recited in claim 1, the method comprising the following steps:

step I, placing the first end of the shielding cover on the step at a bottom of the side surface of the shoulder part of the vacuum heat-insulated container, and laser welding and fixing the primary weld;

step II, laser welding or mouth welding the secondary weld at the second end of the shielding cover to the mouth part of the vacuum heat-insulated container;

step III, removing the first weld bead generated by laser welding in step I by polishing; and step IV, removing the second weld bead generated by laser welding or argon arc welding in step II by sanding the mouth.

6. A method for sealing the two-end-through vacuum heat-insulated container outer tube sealing structure as recited in claim 2, the method comprising the following steps:

step I, placing the first end of the shielding cover on the step at a bottom of the side surface of the shoulder part of the vacuum heat-insulated container, and laser welding and fixing the primary weld;

step II, laser welding or mouth welding the secondary weld at the second end of the shielding cover to the mouth part of the vacuum heat-insulated container;

step III, removing the first weld bead generated by laser welding in step I by polishing; and step IV, removing the second weld bead generated by laser welding or argon arc welding in step II by sanding the mouth.

7. A method for sealing the two-end-through vacuum heat-insulated container outer tube sealing structure as recited in claim 3, the method comprising the following steps:

step I, placing the first end of the shielding cover on the step at a bottom of the side surface of the shoulder part of the vacuum heat-insulated container, and laser welding and fixing the primary weld;

step II, laser welding or mouth welding the secondary weld at the second end of the shielding cover to the mouth part of the vacuum heat-insulated container;

step III, removing the first weld bead generated by laser welding in step I by polishing; and step IV, removing the second weld bead generated by laser welding or argon arc welding in step II by sanding the mouth.

8. A method for sealing the two-end-through vacuum heat-insulated container outer tube sealing structure as recited in claim 4, the method comprising the following steps:

step I, placing the first end of the shielding cover on the step at a bottom of the side surface of the shoulder part of the vacuum heat-insulated container, and laser welding and fixing the primary weld;

step II, laser welding or mouth welding the secondary weld at the second end of the shielding cover to the mouth part of the vacuum heat-insulated container;
step III, removing the first weld bead generated by laser welding in step I by polishing; and
step IV, removing the second weld bead generated by laser welding or argon arc welding in step II by sanding the mouth.

* * * * *